July 5, 1966   D. J. ROGAKOS   3,259,069
WINDSHIELD WASHER PUMP

Filed Sept. 20, 1963   2 Sheets-Sheet 1

INVENTOR.
DENO J. ROGAKOS
BY
HIS ATTORNEY

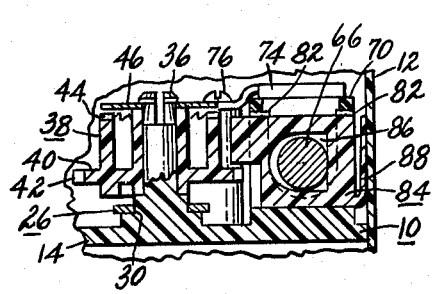
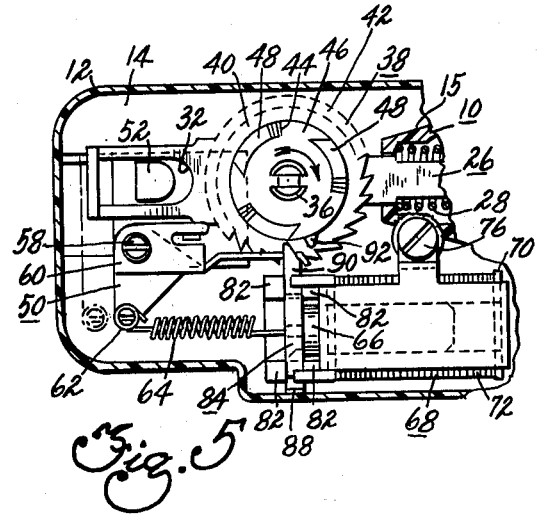
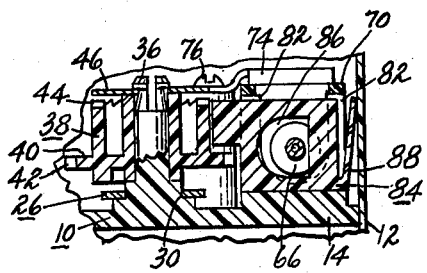
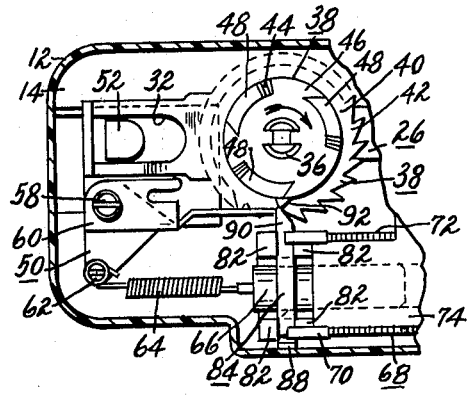
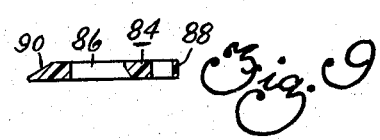
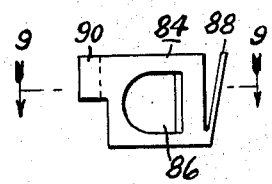
INVENTOR.
DENO J. ROGAKOS
HIS ATTORNEY United States Patent Office
3,259,069
Patented July 5, 1966

3,259,069
WINDSHIELD WASHER PUMP
Deno J. Rogakos, Rochester, N.Y., assignor to General Motors Corporation, Detroit, Mich., a corporation of Delaware
Filed Sept. 20, 1963, Ser. No. 310,241
10 Claims. (Cl. 103—23)

This invention pertains to the art of windshield cleaning, and particularly to an improved washer unit for discharging liquid solvent onto a windshield in timed relation with movement of the wiper blades thereacross.

Heretofore, washer units of the type shown in the Ryck et al. Patent No. 3,078,493, wherein the washer unit comprises a pump having an electrically controlled interruptible driving connection with a wiper motor, have been manufactured. In these washer units the cam follower and its associated slider mechanism is spring biased so as to continuously engage the wiper motor operated drive cam. Thus, even when operation of the washer unit is not required, the cam follower and its associated slider is reciprocated during operation of the wiper unit in what is known as an "idle movement" which necessarily results in wear on the component parts and places an additional load on the wiper motor. This invention relates to an improved washer unit of the aforesaid type wherein the cam follower is effectively disengaged from the wiper motor driven cam during operation of the wiper unit alone, and wherein electrical means are utilized to establish a driving connection between the cam and the cam follower.

Accordingly, among my objects are the provision of a wiper motor driven windshield washer unit including an electrically controlled interruptible cam and cam follower type driving connection between the wiper unit and the washer unit; the further provision of a wiper motor driven washer pump including a cam and cam follower and electromagnetically controlled spring means for establishing a driving connection between the cam and cam follower; and the still further provision of an improved motor driven washer pump assembly including ratchet wheel timing means, electromagnetic means for establishing a driving connection between the motor and the timing means during washer operation, and mechanical means for maintaining and interrupting the driving connection to automatically arrest the washer pump.

The aforementioned and other objects are accomplished in the present invention by utilizing a solenoid and spring arrangement to couple the cam follower of the washer unit to the drive cam of the wiper unit. Specifically, the wiper unit drive cam is directly coupled to the wiper motor so as to be driven in unison therewith. The washer unit cam follower is connected through an extension spring to the plunger of a solenoid, which, when energized, tensions the spring so as to establish a driving connection between the cam and the cam follower. Only momentary energization of the solenoid is required since the plunger is thereafter held in its depressed condition by a mechanical latch, the latch being controlled by a ratchet wheel timer so as to automatically release the plunger and decouple the cam follower from the cam after a predetermined number of wiper unit strokes thus automatically arresting the washer unit.

Further objects and advantages of the present invention will be apparent from the following description, reference being had to the accompanying drawings, wherein a preferred embodiment of the present invention is clearly shown and wherein like numerals depict like parts throughout the several views.

In the drawings:

FIGURE 4 is a fragmentary sectional view taken along line 4—4 of FIGURE 2.

FIGURE 5 is a fragmentary, sectional view similar to FIGURE 1, of the washer unit in the "on" position.

FIGURE 6 is a fragmentary, sectional view similar to FIGURE 4, with the washer in the "on" position.

FIGURE 7 is a fragmentary, sectional view similar to FIGURE 5 showing the relationship of the several parts at the completion of a washing cycle.

FIGURE 8 is a view in elevation of the latch for the solenoid plunger.

FIGURE 9 is a sectional view taken along line 9—9 of FIGURE 8.

Figure 1:
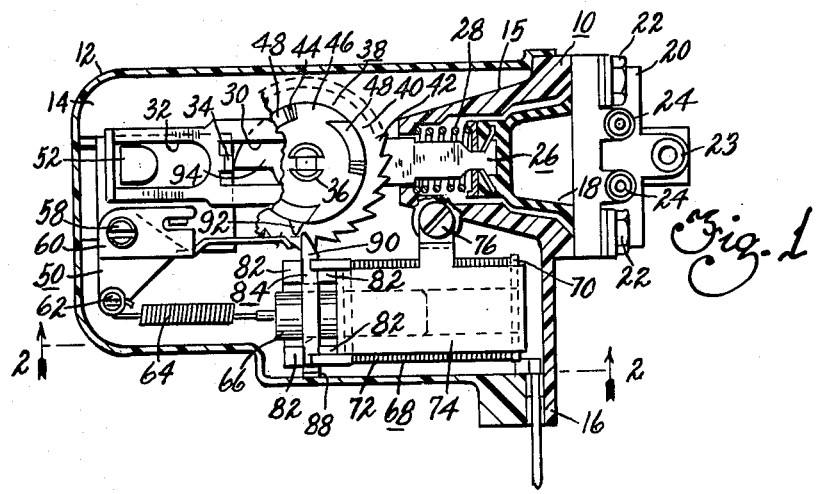
FIGURE 1 is a view, partly in section and partly in elevation, with certain parts broken away depicting the improved washer unit in the "off" position.
Figure 2:
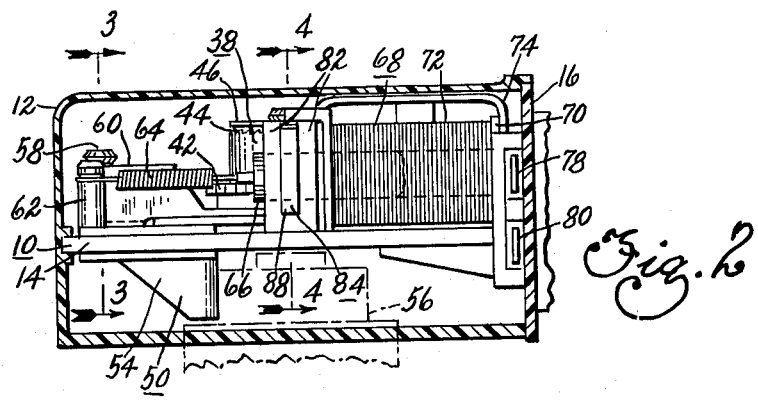
FIGURE 2 is a sectional view taken along line 2—2 of FIGURE 1, with the wiper unit driven cam shown in phantom.

With reference to FIGURES 1 and 2, the improved washer unit includes a frame 10 of molded plastic material upon which the components of the washer pump assembly are mounted, and a molded plastic housing, or cover, 12 which forms an enclosure for the component parts and is attached to the frame 10 by a screw, not shown. All of the molded plastic parts of the washer unit are composed of a thermoplastic polymer of a linear acetal resin known in the trade as "Delrin." The frame 10 has a flat base portion 14 and an end wall 16, the end wall having a substantially conical hollow formation 15 thereon for enclosing a rubber or rubber-like bellows 18 constituting the liquid displacing element of the pump assembly. A valve housing 20, attached by a plurality of screws 22 to the conical formation 15, contains inlet and outlet check valves communicating with the interior of the bellows 18 and also communicating with an inlet nipple 23 and a pair of outlet nipples 24.

The bellows 18 is connected to a reciprocable pump rod 26, one end of which is encircled by a compression spring 28. The pump rod 26 extends longitudinally of the frame and is formed with a medial elongate slot 30 and a second elongate slot 32 adjacent its other end, with the slots 30 and 32 being spaced by a web having an upstanding lug 34 thereon.

Figure 3:
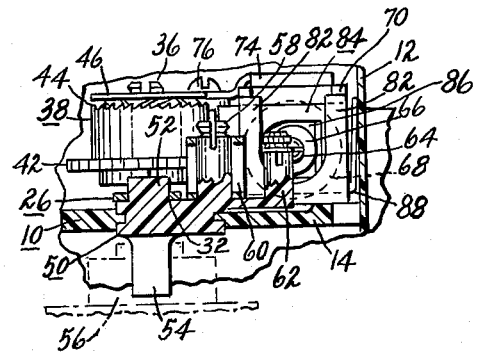
FIGURE 3 is a fragmentary sectional view taken along line 3—3 of FIGURE 2.

The base 14 of the frame 10, as seen particularly in FIGURES 4 and 6, is formed with an upstanding trunnion, or stub shaft, 36 upon which a nylon ratchet cam assembly 38, constituting the timing element of the washer unit, is journalled. The ratchet cam assembly 38 is in the form of a drum having a flange 40 with ratchet teeth 42 on the periphery thereof, and a second set of ratchet teeth 44 on the upper edge of the drum as seen in FIGURES 3, 4 and 6. The stub shaft 36 extends through the elongate slot 30 in the pump rod 26 thus permitting reciprocation of the pump rod relative to the stub shaft. The ratchet cam assembly 38 is held in assembled relation with the stub shaft 36 by a spring metal retainer 46 having three arcuate hold pawl fingers 48 engageable with the ratchet teeth 44 so as to prevent reverse rotation of the ratchet cam 38.

As seen particularly in FIGURE 3, a molded plastic cam follower 50 has a tongue and groove sliding connection within a slot in the base 14 of the frame 10, the cam follower 50 having an upstanding lug 52 disposed within the arcuate slot 32 of the pump rod 26, and a depending lug 54 adapted to engage a multiple lobe cam shown in phantom at 56. In addition, the slidable cam follower assembly 50 has an upstanding boss 58 to which a metal drive pawl 60 is attached. The drive pawl 60 has continuous engagement with the ratchet teeth 42 for imparting clockwise movement to the ratchet cam assembly 38 as seen in FIGURES 5 and 7 during operation of the washer unit. It is at this time that the ratchet retainer 46 prevents reverse, or counterclockwise, rotation of the ratchet cam 38.

The cam follower assembly 50 also has an upstanding boss 62 which is connected by an extension spring 64 to a plunger 66 of a solenoid 68. The solenoid includes a plastic bobbin 70 having a coil 72 wound therearound and a U-shaped metal strap 74, constituting the pole pieces, attached to the frame 10 by a screw 76. The ends of the coil 72 are connected to terminals 78 and 80.

The frame 10 has four upstanding lugs 82 integral with the base 14, the lugs 82 being suitably spaced and in alignment with the solenoid, or electromagnet, 68 so as to define a transverse slot adapted to slidably support a molded plastic latch 84. As seen particularly in FIGURES 8 and 9, the molded plastic latch 84 has an obround hole 86 formed therein with an integral spring leg 88 and a cam follower 90. The cam follower 90 of the latch 84 coacts with a cam rise 92 formed on the periphery of the drum-type ratchet cam assembly 38. The upstanding lug 34 of the pump rod 26 coacts with a lockout cam 94 of the ratchet cam assembly as will be pointed out more particularly hereinafter.

To initiate a washing cycle it is only necessary to momentarily energize the solenoid 68. It is to be understood, of course, that the washer unit of the present invention is mounted adjacent to a wiper unit which, during operation, continuously rotates the multiple lobe drive cam 56 in timed relation movement of the wiper blades across the surface of a windshield. Preferably, although not necessarily, conjoint operation of the washer unit with the wiper unit is effected through a push button switch of the type shown in Ziegler Patent No. 2,905,962 whereby the electric wiper motor can be concurrently energized with the washer solenoid 68. This switch also permits operation of the wiper unit independently of the washer unit in a manner well known in the art.

When the solenoid 68 is energized the plunger 66 moves from the position of FIGURE 1 to the position of FIGURE 5, that is, it is drawn into the hollow core of the bobbin 70. This extends the spring 64 so as to pull the cam follower 54 into engagement with the wiper unit driven cam 56 and effectively couple, or establish a driving connection, between the cam 56 and the cam follower 50. When the solenoid plunger 66 moves into the core of the bobbin 70, the spring arm 88 of the latch 84 biases the latch 84 transversely of the solenoid from the position of FIGURES 1 and 4 to the position of FIGURES 5 and 6 and thus maintains the solenoid plunger fully depressed within the core of the bobbin 70. Accordingly, rotation of the wiper unit cam 56 will impart reciprocation of the cam follower 50 through the lug 54, and reciprocation of the cam follower 50 will in turn reciprocate the pump rod 26 so as to compress the spring 28 to complete the intake stroke of the bellows pump 18. As the cam follower 50 follows the profile of the driven cam 56 and reaches a dwell, the energy stored in the pump spring 28 will collapse the bellows pump 18 to effect a delivery stroke thereof. Concurrently with intermittent operation of the pump, the drive pawl 60 will impart step-by-step rotation to the ratchet cam 38 in the clockwise direction thus timing the operation of the washer unit by counting the strokes of the wiper unit. After a predetermined angular movement of the ratchet cam 38, for example 240°, the lockout cam 94 will engage the lug 34 on the pump rod so as to arrest movement of the pump rod by interrupting the driving connection between the pump rod and the cam follower 50 thereby automatically arresting operation of the washer pump. The cam follower 50 will continue to reciprocate and thus impart step-by-step movement to the ratchet cam 38 until it has completed one revolution, whereat the cam 92 will engage the follower 90 on the latch 84 as depicted in FIGURE 7, so as to move the latch transversely and permit the spring 64 to withdraw the solenoid plunger 66. As soon as the tension on the spring 64 has been relieved, the projection, or lug 54 on the cam follower is no longer drivingly connected to the wiper unit drive cam 56, and consequently movement of the cam follower 50 and the ratchet cam 38 is arrested.

From the foregoing it is apparent that the present invention is directed to an improved intermittent squirt-type washer pump capable of being driven by a wiper motor wherein the "idle movement" of the cam follower has been eliminated when the washer unit is not in operation. The present construction simplifies the washer mechanism and eliminates unnecessary wear of the several parts during operation of the wiper unit alone.

While the embodiment of the invention as herein disclosed constitutes a preferred form, it is to be understood that other forms might be adopted.

What is claimed is as follows:

1. A washer unit for a vehicle windshield adapted to be driven by an angularly movable cam including, a frame, a cam follower slidably supported on said frame, a pump supported on said frame having an intake stroke and a delivery stroke, a reciprocable pump rod having a driving connection with said cam follower for operating said pump, solenoid actuated spring means for establishing a driving connection between said cam follower and said cam to initiate operation of said washer unit, mechanical means for maintaining said driving connection between said cam follower and said cam to continue operation of said washer unit independently of said solenoid, and means operable to release said mechanical means to interrupt said driving connection.

2. A washer unit for a vehicle windshield adapted to be driven by a rotatable cam including, a frame, a reciprocable cam follower slidably supported on said frame, a pump supported on said frame having an intake stroke and a delivery stroke, a reciprocable rod having a driving connection with said cam follower for operating said pump, solenoid actuated spring means for coupling said cam follower to said cam to initiate operation of said washer unit, mechanical means for maintaining said cam follower coupled to said cam independently of said solenoid, and means operable to release said mechanical means to decouple said cam follower from said cam.

3. A washer unit for a vehicle windshield adapted to be driven by a rotatable cam including, a frame, a reciprocable cam follower slidably supported on said frame, a pump supported on said frame having a spring actuated delivery stroke, a reciprocable pump rod for effecting the intake stroke of said pump, said pump rod having a driving connection with said cam follower, electromagnetic actuated spring means for coupling said cam follower to said cam to operate said washer unit, mechanical means for maintaining the cam follower coupled to said cam independently of said electromagnet, and means operable to release said mechanical means to decouple said cam follower from said cam.

4. The washer unit set forth in claim 3 wherein said electromagnet comprises a solenoid having a plunger, said plunger and said cam follower being interconnected by an extension spring.

5. The washer unit set forth in claim 4 including a reciprocable latch for retaining said plunger in a depressed condition upon momentary energization of said solenoid.

6. A washer unit for a vehicle windshield adapted to be driven by an angularly movable cam including, a frame, a cam follower slidably supported on said frame, a pump supported on said frame having an intake stroke and a delivery stroke, a reciprocable pump rod having a driving connection with said cam follower for actuating said pump, a rotatable ratchet cam assembly supported on said frame including a ratchet wheel and a cam, said pump rod being engageable with said ratchet cam to interrupt the driving connection between said pump rod and said cam follower, said cam follower having a drive pawl for rotating said ratchet cam assembly, solenoid actuated spring means for initiating the driving connection between said cam follower and said cam, mechanical means controlled by said ratchet cam assembly for maintaining said driving connection between said cam follower and said cam to continue operation of said washer unit independently of said solenoid, and means operable to release said mechanical means to thereafter automatically interrupt said driving connection to arrrest said washer unit.

7. A washer unit for a vehicle windshield adapted to be driven by an angularly movable cam including, a frame, a timer for said washer unit comprising a rotatable ratchet cam assembly supported on said frame, said ratchet cam assembly having a ratchet wheel and a pair of cams, a pump supported on said frame, a reciprocable pump rod for actuating said pump, a reciprocable cam follower slidably supported on said frame, said pump rod having an interruptible driving connection with said cam follower and being engageable with one of said ratchet cams to interrupt the driving connection between said cam follower and said pump rod, a drive pawl attached to said cam follower having continuous engagement with said ratchet wheel for imparting step-by-step movement thereto, solenoid actuated spring means for establishing a driving connection between said cam follower and said cam to initiate operation of said washer unit, mechanical means controlled by the other of said ratchet cams for maintaining said driving connection between said cam follower and said cam to continue operation of said washer unit independently of said solenoid, and means operable to release said mechanical means to thereafter automatically interrupt the said driving connection to arrest said washer unit.

8. The washer unit set forth in claim 7 wherein said solenoid includes a plunger, and wherein said plunger and said cam follower are interconnected by an extension spring.

9. The washer set forth in claim 8 wherein said mechanical means comprises a latch slidably supported on said frame for movement in a direction transverse to the axis of said plunger for retaining said plunger in a depressed condition upon momentary energization of said solenoid, and wherein said latch includes a cam follower engageable with said other of said ratchet cams at a predetermined angular position of said ratchet cam assembly for releasing said plunger to interrupt the driving connection between said cam follower and said cam.

10. In a windshield washer pump of the type having a spring actuated delivery stroke, a reciprocable pump rod for effecting the intake stroke, a wiper motor having a rotatable cam and a ratchet cam assembly for timing the operation of said washer pump, the improvement which comprises, a reciprocable cam follower having a drive pawl continuously engaging said ratchet cam assembly and having a driving connection with said pump rod, solenoid actuated spring means for coupling said cam follower to said cam to establish a driving connection between said cam follower and said cam, mechanical means for maintaining the driving connection between said cam follower and said cam independently of said solenoid, and means on said ratchet cam assembly engageable with said mechanical means at a predetermined angular position of said ratchet cam assembly for interrupting the driving connection between said cam follower and said cam.

References Cited by the Examiner

UNITED STATES PATENTS

| | | | |
|---|---|---|---|
| 2,064,750 | 12/1936 | Hurst | 103—38 |
| 2,836,119 | 5/1958 | Kugler | 103—23 |
| 2,878,505 | 3/1959 | Zeigler | 103—23 |
| 2,957,420 | 10/1960 | Reynolds et al. | 103—23 |
| 2,981,194 | 4/1961 | Bettoni | 103—23 |
| 3,092,029 | 6/1963 | Hanson et al. | 103—23 |
| 3,093,082 | 6/1963 | Zeigler | 230—15 |
| 3,152,726 | 10/1964 | Chivers | 103—150 |

SAMUEL LEVINE, *Primary Examiner.*

DONLEY J. STOCKING, *Examiner.*

W. L. FREEH, *Assistant Examiner.*